W. G. BARRATT.
TEAPOT AND COFFEEPOT.
APPLICATION FILED NOV. 28, 1921.

1,416,321.

Patented May 16, 1922.

Inventor.
William G. Barratt,
by Herbert W. Jenner.
Attorney.

UNITED STATES PATENT OFFICE.

WILLIAM GEORGE BARRATT, OF STOKE-ON-TRENT, ENGLAND.

TEAPOT AND COFFEEPOT.

1,416,321.  Specification of Letters Patent.  Patented May 16, 1922.

Application filed November 28, 1921. Serial No. 518,210.

*To all whom it may concern:*

Be it known that I, WILLIAM GEORGE BARRATT, subject of the King of Great Britain and Ireland, and resident of Bournes Bank Pottery, Burslem, Stoke-on-Trent, in the county of Stafford, England, earthenware manufacturer, have invented certain new and useful Improvements in Teapots and Coffeepots, of which the following is a specification.

My invention relates to improvements in teapots, and coffee pots, the object being to provide simple means for retaining the lid in position during pouring and thus preventing it falling away from the main vessel as is often the case.

The invention consists essentially in constructing the teapot or coffee pot with a handle having its upper inner end projecting over the mouth or opening in the vessel so as to extend over the lid or cover and retain it in position during the action of pouring out the liquid, allowing the lid to be easily removed and placed in position again when necessary.

Figure 1:
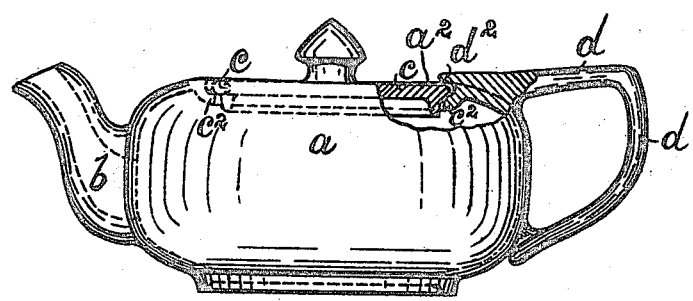
Figure 2:
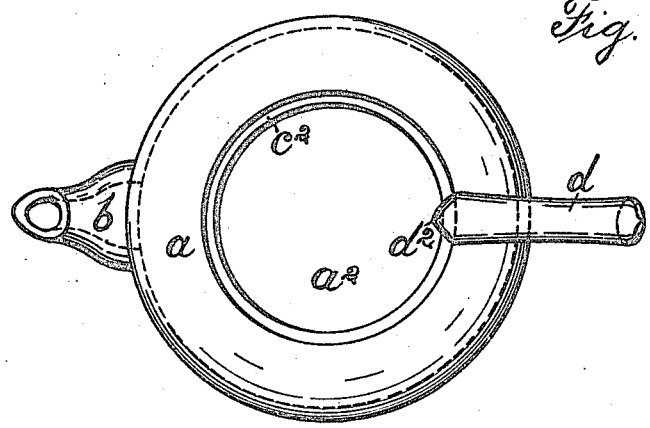

My invention will be fully described with reference to the accompanying drawings in which, Fig. 1 is an elevation of a teapot, partly in section, with the lid in position, and Fig. 2 is a plan of same with the lid removed.

In the drawing $a$ is the vessel or body of the teapot, $b$ the spout and $c$ the lid or cover, the parts being of the usual construction.

According to my said invention I construct the handle $d$ with its inner end $d^2$ extending over the edge of the mouth or opening $a^2$ of the vessel $a$ as shown at Fig. 2. To place the lid $c$ in position the edge thereof is allowed to take under the projecting end $d^2$ of the handle $d$ and to rest on the flange $c^2$. When the teapot is tilted to pour out the tea or other liquid the lid makes contact with the underside of the projecting end $d^2$ of the handle $d$ which prevents the lid or cover $c$ falling away from the mouth or opening $a^2$.

By constructing the handle $d$ with its upper inner end $d^2$ projecting over the mouth or opening, the lid is retained in position during pouring but can be readily removed when necessary.

What I claim as my invention and desire to secure by Letters Patent is:—

A pot provided with a pouring spout, and a handle, said pot having an opening at its top and a flange extending around its opening below the level of its top, said pot having also a lug arranged adjacent to its handle and projecting crosswise over the said flange towards the spout, and a lid which rests on the said flange and engages with the said lug and is thereby prevented from falling off when the pot is tilted to pour out its contents.

In testimony whereof I have hereunto set my hand in the presence of two witnesses.

WILLIAM GEORGE BARRATT.

Witnesses:
J. BENTON,
J. H. COPESTAKE.